United States Patent
Downers

[11] 3,858,496
[45] Jan. 7, 1975

[54] DEVICE FOR SUSPENDING FOOD ARTICLES IN A COOKING MEDIUM

[76] Inventor: Delores B. Downers, P.O. Box 448, Livingston, Mont. 59047

[22] Filed: May 22, 1973

[21] Appl. No.: 363,179

[52] U.S. Cl. .................................. 99/448, 99/449
[51] Int. Cl. ............................................ A47j 43/18
[58] Field of Search...... 99/448, 291, 298, 339–340, 99/367, 374, 413, 416, 421, 430, 432–433, 440, 449; 126/20.1, 369.2; 220/96; 249/87, 92; 198/131; 134/135, 201; 248/216, 226 E

[56] References Cited
UNITED STATES PATENTS

| | | | |
|---|---|---|---|
| 1,101,730 | 6/1914 | Day.................................. | 99/449 X |
| 1,299,135 | 4/1919 | Cummings .................... | 99/413 UX |
| 1,706,491 | 3/1929 | Jenkins ......................... | 99/421 V X |
| 2,175,324 | 10/1939 | Stamp............................. | 249/92 |
| 2,257,408 | 9/1941 | Alexander..................... | 99/433 |
| 2,744,635 | 5/1956 | Hiss................................... | 134/135 |
| 3,563,160 | 2/1971 | Otsuka........................... | 99/421 V X |

Primary Examiner—Robert L. Bleutge
Assistant Examiner—Arthur O. Henderson
Attorney, Agent, or Firm—Mallickrodt & Mallinckrodt

[57] ABSTRACT

A device for hanging onto the rim of a cooking vessel and suspending a number of stick-carried food items, such as batter-coated wieners, in a cooking medium, such as frying oil, contained in the vessel. The device comprises an elongate frame member preferably bent upon itself in either a closed or open loop formation, a plurality of hooks for suspending the frame member from the rim of a cooking vessel, and several clips attached to the frame member in spaced relationship along its length with each clip adapted to receive the end of a stick having a food item impaled thereon, whereby the food item on the stick is suspended in the cooking medium.

3 Claims, 2 Drawing Figures

Patented Jan. 7, 1975 3,858,496

DEVICE FOR SUSPENDING FOOD ARTICLES IN A COOKING MEDIUM

BACKGROUND OF THE INVENTION

1. Field

The invention is directed to devices for cooking articles of food submerged in a cooking medium.

2. State of the art

Cooking of a plurality of food articles submerged in a cooking medium has customarily been accomplished by placing the articles randomly in a cooking vessel containing the cooking medium, wherein the food articles contact each other and the sides of the utensil during the cooking period. If the food articles have been coated with a batter or other coating material which is to fry to a brown, crisp condition, contact between the food articles and themselves or the sides of the cooking vessel tends to disrupt the coating on the food articles, and the food articles stick to one another and to the sides of the cooking vessel. Further, the food articles tend to float on the surface of the cooking medium, and the portion of the food article above the surface of the cooking medium does not cook or brown at the same rate as the portion submerged in the cooking medium.

In U.S. Pat. No. 3,466,999 a lid, dimensioned for resting on the rim of a cooking vessel and having a plurality of skewer pins projecting from one face thereof upon which an article of food can be impaled, is disclosed. The pins and the articles of food project downwardly into a cooking vessel when one face of the lid rests on the rim of the cooking vessel. The lid is reversible so that the impaled articles of food will extend upwardly when the opposite side of the lid is rested on the rim of the cooking vessel. The food articles are held out of contact with each other and out of contact with the wall of the vessel during frying. However, the food articles must be cooled in their upwardly extending position before being removed from the skewer pins. Additional food articles to be cooked can then be impaled on the skewers and fried, however, after each group of food articles have been fried, a waiting period is required while these articles cool and are removed from the skewer pins before additional food articles can be impaled thereon and fried.

In many instances it is desirable to eat the food article, such as a batter-coated wiener, immediately after it has been fried and before it has cooled. With the apparatus shown in U.S. Pat. No. 3,466,999 it is inconvenient to remove the food articles from the skewer pins so that the food articles could be consumed while still hot.

SUMMARY OF THE INVENTION

In accordance with the present invention, an elongate frame member, preferably bent upon itself in a closed or open loop formation, is provided with a plurality of hook members for suspending the frame on the rim of a cooking vessel. A plurality of clips are attached to the frame member in spaced relationship along the length of the frame member. When the frame member is suspended on the rim of the cooking vessel, the clip members are positioned directly above the cooking medium in the vessel. Each of the clip members is adapted to releasably hold one end portion of an elongate, stick-like member. The stick-like member extends downwardly, and a food article, such as a batter-coated wiener, is impaled on the downwardly extending portion of the elongate member and suspended in the frying medium.

The articles of food are held out of contact with each other and out of contact with the sides of the cooking utensil while being cooked. When the food articles have been sufficiently cooked, the stick members with the cooked food articles still impaled thereon are detached from the clip members on the frame and removed from the cooking vessel. Additional food items impaled on stick members can then be immediately placed in the cooking vessel and attached to empty clip members. The cooked food items can be consumed while they are hot and still impaled on the stick members. The end portions of the stick members which had been engaged with the clip members are used as a means for holding the food article while it is being consumed.

THE DRAWING

The device illustrated in the accompanying drawings represents the best mode presently contemplated for carrying out the invention, although it is recognized that the inventive concepts here taught can be utilized in a variety of specific forms within the scope of the claims.

In the drawings:

FIG. 1 is a plan view of the device per se;

FIG. 2, a fragmentary view, partly in elevation and partly in vertical section taken on the line 2—2 of FIG. 1, of the device as suspended from the rim of a cooking vessel.

DETAILED DESCRIPTION OF THE PREFERRED EMBODIMENTS

Figure 1:
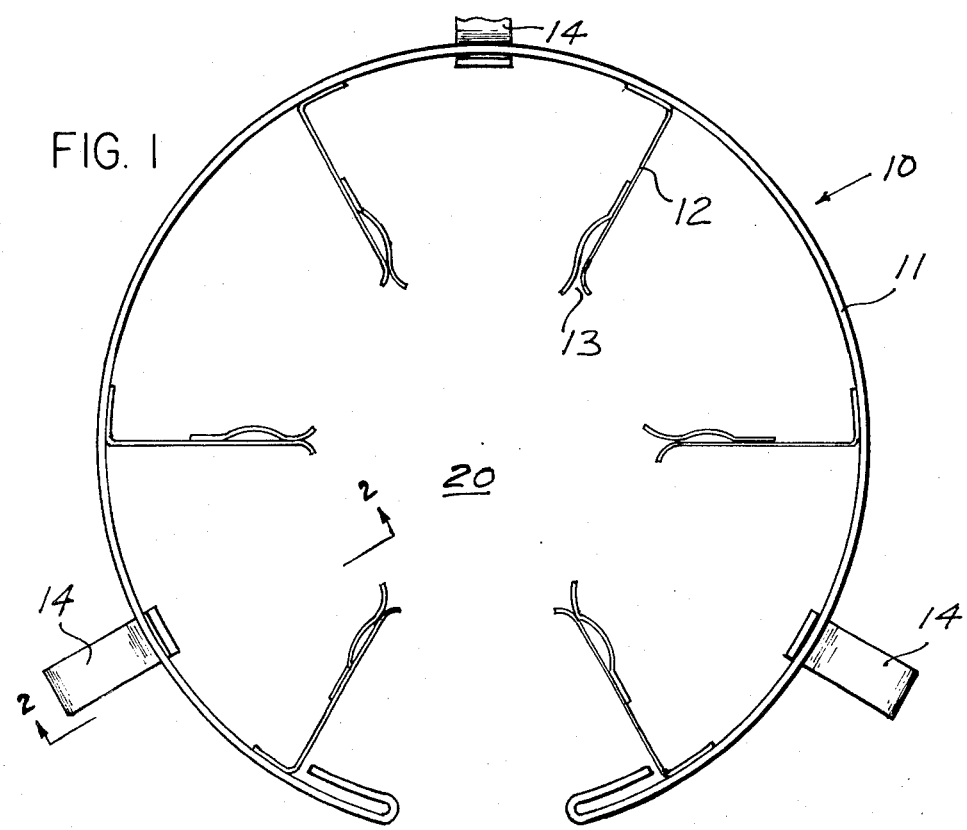

As illustrated in FIG. 1, the cooking device 10 comprises a strip of material 11 bent upon itself in open loop formation. A plurality of hooks 14 are attached to strip 11 for suspending strip 11 from the rim of a vessel. A plurality of brackets 12 are attached to strip 11 with the free end thereof terminating in a clip 13. Strip 11 can be formed into a closed loop instead of the open loop as illustrated in FIG. 1. Strip 11 can also be formed into other shapes instead of a loop, for example, it can be bent into a square, rectangular, triangular or other shape.

Figure 2:
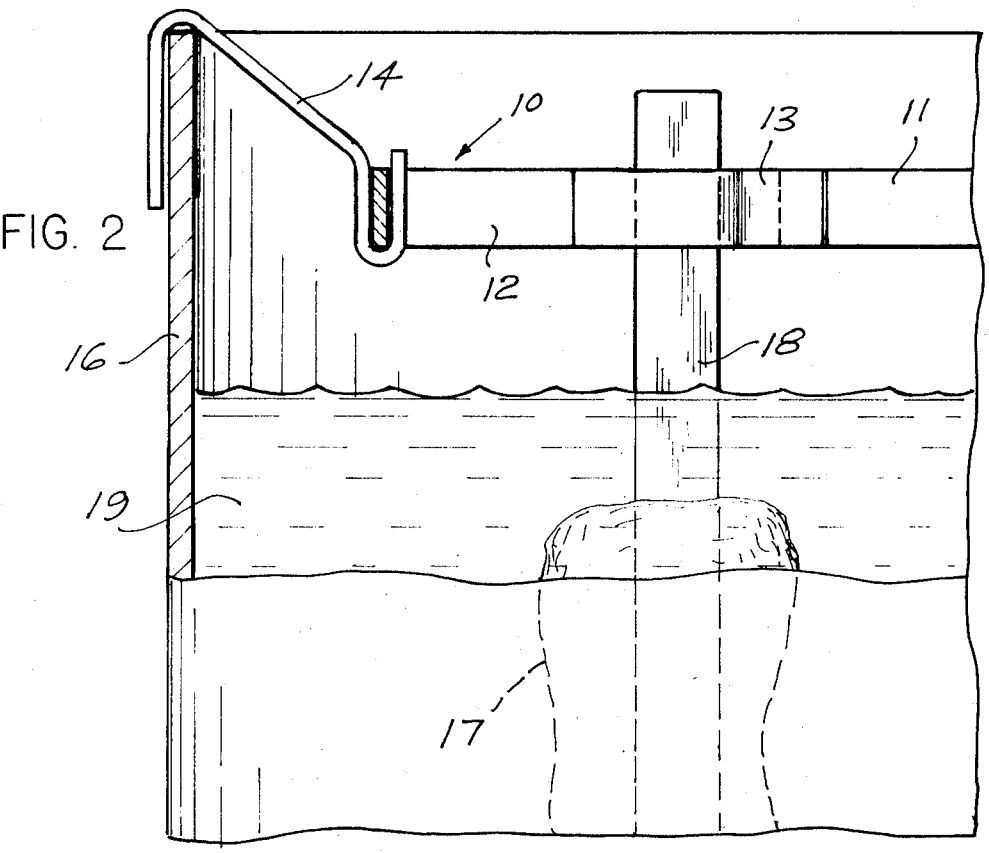

In FIG. 2, the device 10 is illustrated suspended from the rim of a cooking vessel 16. The end of stick 18 extending from the food item 17 is releasably held in place by clip 13 and the food items 17 on sticks 18 are properly suspended in the cooking medium 19.

When food articles such as batter-coated wieners are cooked using the device illustrated in FIGS. 1 and 2, there is no interference between any of the suspended wieners when cooked wieners are removed from the cooking vessel or when new wieners to be cooked are added to the cooking vessel, and the wieners are held out of contact with each other and out of contact with the walls of the cooking vessel during the cooking thereof. After the wieners have been cooked, they can immediately be removed from the device while still impaled on the stick. The sticks are used as handles for the hot, cooked wiener while it is being consumed. Additional food items, impaled on sticks, can be attached to the device and cooked immediately without waiting for the prior cooked items to cool. The device is seen to be simple in construction and easy to use and keep clean.

As shown in FIG. 1, strip 11 preferably has an open loop form, i.e., it is incomplete in its perimeter. It is also made of a resilient yet flexible material so that it can be bent outwardly or inwardly to suit the perimeter of the cooking vessel 16 being used. In FIGS. 1 and 2, device 10 is shown as being circular shape. However, cooking vessels may have many different shapes and the device 10 can be shaped accordingly so that the hook members thereof can engage the rim of such cooking vessels.

As will be recognized from the above description, the device need not be removed from the cooking vessel while cooking even a great number of food articles. The food articles on the stick members are attached to and detached from the device in succession while the device remains attached to the cooking vessel.

I claim:

1. A device for suspending food impaled on an elongate member, such as a stick or the like, in a cooking medium, said device comprising an elongate frame member which is bent upon itself in a loop formation; means for supporting said frame member on the rim of a cooking vessel containing said cooking medium, said means comprising a plurality of elongate support members attached to said frame member at spaced intervals therealong and projecting therefrom in a direction generally outwardly from the loop formed by said frame member, with the free ends of said support members being bent into hooks which are adapted to be hooked over the rim of said cooking vessel; and a plurality of brackets attached to said frame member at spaced intervals therealong and projecting laterally therefrom, said brackets having clip members attached at the terminal end thereof, each of said clip members adapted for releasably securing an end portion of said elongate member to said bracket, whereby said elongate member extends downwardly from said bracket and frame member with said food impaled on the downwardly extending portion of said elongate member.

2. A device as claimed in claim 1 wherein said frame member is incomplete in its perimeter so that it may be bent outwardly or inwardly to suit the perimeter of the cooking vessel.

3. A device as claimed in claim 1 in combination with a cooking vessel.

* * * * *

PO-1050
(5/69)

UNITED STATES PATENT OFFICE
CERTIFICATE OF CORRECTION

Patent No. 3,858,496          Dated January 7, 1975

Inventor(s) Delores B. Downer

It is certified that error appears in the above-identified patent and that said Letters Patent are hereby corrected as shown below:

Under [Item 19], "Downers" should be -- Downer --.

Under the Heading "Inventor:" the name

"Downers" should be --Downer--.

Signed and sealed this 8th day of April 1975.

(SEAL)
Attest:

RUTH C. MASON
Attesting Officer

C. MARSHALL DANN
Commissioner of Patents
and Trademarks